United States Patent [19]
Walker et al.

[11] Patent Number: 4,570,247
[45] Date of Patent: Feb. 11, 1986

[54] DUAL-BAND ULTRASONIC MOTION DETECTOR

[75] Inventors: Michael J. Walker, Romsley, Nr Halesowen; Jeffry A. Bagnall, Warley, both of England

[73] Assignee: Lucas Industries Ltd., Birmingham, England

[21] Appl. No.: 553,484

[22] Filed: Nov. 18, 1983

[30] Foreign Application Priority Data

Dec. 2, 1982 [GB] United Kingdom ............... 8234379

[51] Int. Cl.$^4$ ........................................... G08B 13/18
[52] U.S. Cl. .................................... 367/93; 340/552
[58] Field of Search .................. 367/93, 94; 340/554, 340/552

[56] References Cited

U.S. PATENT DOCUMENTS

3,803,539 4/1974 McMaster ........................... 367/94
3,885,234 5/1975 Fujimoto ............................ 367/94

Primary Examiner—Glen R. Swann, III
Attorney, Agent, or Firm—Trexler, Bushnell & Wolters, Ltd.

[57] ABSTRACT

A motion detector system includes an ultrasonic transmitter, receiver and phase detector which produces as output signals of frequency related to the speed of movement of any moving object in a zone being monitored. The output of the phase detector is fed to two separate bandpass filters having different pass-bands characteristic of the frequencies generated by a human being moving in the zone being monitored. A warning is sounded only when signals have been present in both bands for more than a predetermined period.

4 Claims, 4 Drawing Figures

DUAL-BAND ULTRASONIC MOTION DETECTOR

BACKGROUND OF THE INVENTION

This invention relates to motion detector systems primarily intended for use in intrusion alarms of the active type-i.e. systems in which signals are emitted by a transmitting device and reflected signals are received by a receiving device, the receiver signals being analysed to obtain an indication of the presence of an intruder.

With detection systems of this type the problem of distinguishing signals reflected from an intruder from those reflected from other moving objects such as curtains, vibrating window, air current, insects, etc has long been known. Various attempts have been made to overcome such problems such as low pass filtering of the receiver device output, integration of the receiver device output and the application of the receiver device output to a simple timer circuit, but none of these have been entirely satisfactory.

OBJECTS AND SUMMARY OF THE PRESENT INVENTION

In accordance with the present invention, a motion detector system comprises a transmitter device for transmitting oscillatory signals into a zone to be monitored, a receiver device for receiving signals reflected from objects within the zone to be monitored, a phase comparator device receiving electrical inputs from the transmitter device and the receiver device and providing an oscillatory output the frequency of which is dependent on the speed of any movement of an object in the zone to be monitored, filter means connected to the phase comparator device and having a characteristic matched to a movement profile of a specific type of object to be detected, and means connected to the output of the filter means to provide a warning signal only when the movement profile of an object in the zone to be monitored matches the characteristic of said filter means.

Typically, where the objects to be detected are human beings the filter means may comprise two filter circuits which are each connected to the output of the phase comparator device. One filter circuit has a pass band of 28–38 Hz and the other a pass band of 120–190 Hz. The outputs of the two filter circuits are combined to provide a warning signal only when the output of the phase comparator device contains a component in both frequency bands simultaneously. It has been found that other moving objects do not produce this combination of frequencies which is characteristic of human movements. Different objects are found to have different characteristic movement profiles which can be matched by the characteristics of different filter means having one, two or more filter circuits with different pass bands, with their outputs combined.

The outputs of the filter circuits are preferably combined by means of a combining circuit which provides an output only if the outputs from the filter circuits exceed a predetermined threshold for a predetermined period of time.

THE DRAWINGS

DETAILED DESCRIPTION OF THE PREFERRED EMBODIMENT

Figure 1:
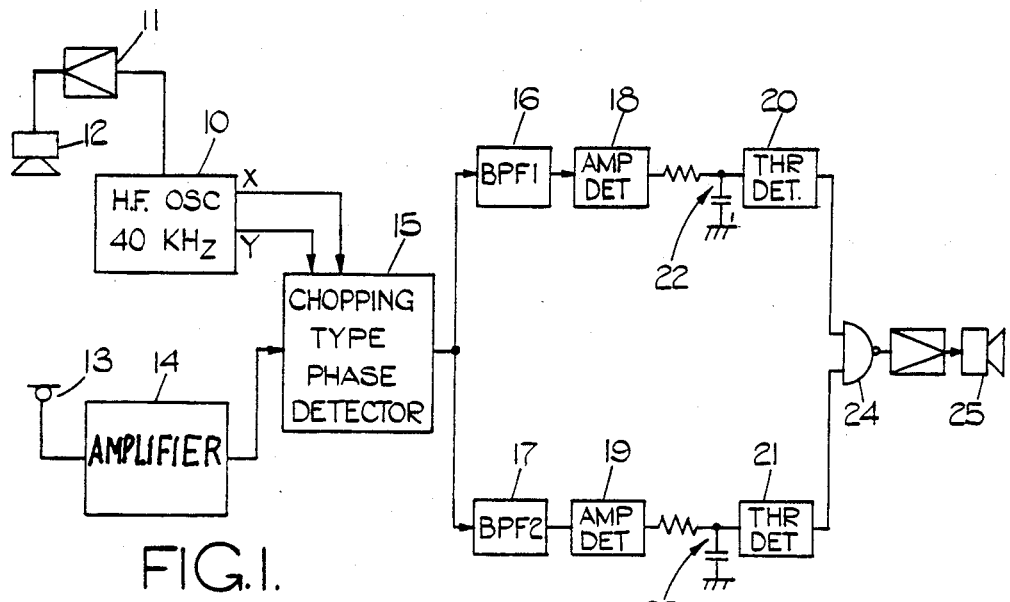
FIG. 1 is a block diagram of an example of a detector system in accordance with the invention.

Referring firstly to FIG. 1, the system shown includes a transmitter consisting of an oscillator 10, a power amplifer 11 and an ultrasonic transducer 12. There is also a receiver which consists of a transducer 13 and an amplifier 14. Electrical signals from the oscillator 10 and the receiver amplifier 14 are applied to the inputs of a phase comparator 15, the output of which is connected to the inputs of two filter circuits 16 and 17 which are band pass filter circuits with pass bands of 28 to 38 Hz and 120–190 Hz respectively. Associated with each filter circuit is an amplitude detector circuit 18, 19 which drives an associated threshold detector circuit 20, 21 through the intermediary of an RC circuit 22, 23. The outputs of the two circuits 20 and 21 are fed to a gate 24, the output of which drives an alarm circuit 25 through a power amplifier.

Figure 2:
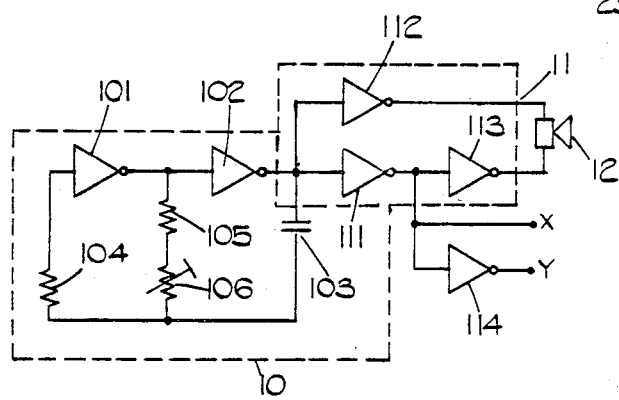
FIG. 2 is a circuit diagram of a transmitter device included in FIG. 1.

Turning now to FIG. 2, the oscillator 10 will be seen to comprise two inverters 101, 102. The output of inverter 101 is connected to the input of inverter 102 and the output of inverter 102 is connected by a capacitor 103 and resistor 104 in series to the input of inverter 101. A resistor 105 and a variable resistor 106 in series connect said input of inverter 102 to the common point of capacitor 103 and resistor 104.

The oscillator operates in well known manner and its frequency is adjusted to a value in the region of 40K Hz using the variable resistor 106.

The amplifier 11 consists of two further inverters 111 and 112 connected to the output of inverter 102 and an inverter 113 connected to the output of inverter 111. The ultrasonic transducer 12 is connected between the outputs of inverters 112 and 113. A terminal X is connected to the output of inverter 111 and yet another inverter 114 has its input connected to the output of inverter 111 and its output connects to a terminal Y.

Figure 3:
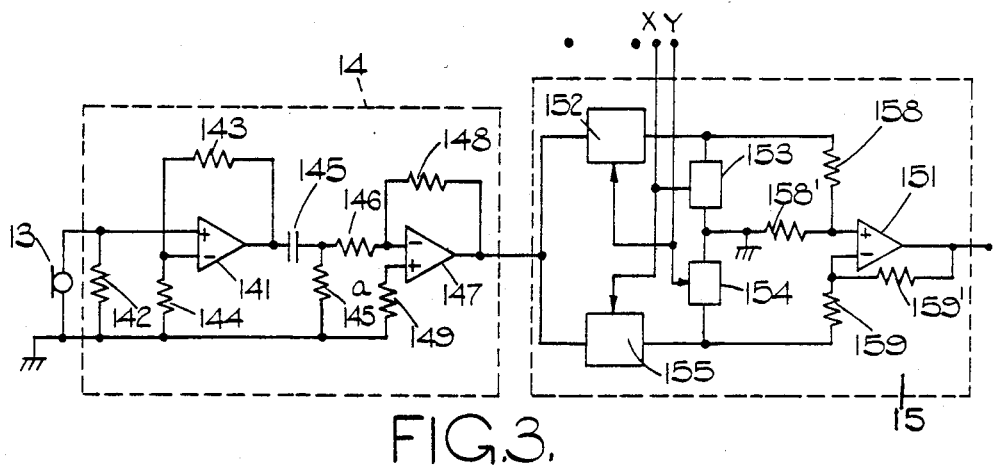
FIG. 3 is a circuit diagram of a receiver device and a phase comparator included in FIG. 1.

As shown in FIG. 3 the transducer 13 is connected between the non inverting input of an operational amplifier 141 and ground. A load resistor 142 is connected across the transducer 13. A resistor 143 connects the output of amplifier 141 to its inverting input which is connected by a resistor 144 to ground. Amplifier 141 acts as a non-inverting amplifier with a gain of about x20. The output of amplifier 141 is coupled by a capacitor 145 and a resistor 146 in series to the inverting input of an operational amplifier 147, a resistor 145a connecting the junction of capacitor 145 and resistor 146 to ground. A feedback resistor 148 connects the output of amplifier 147 to the inverting input thereof and a resistor 149 connects the non-inverting input of amplifier 147 to ground. Amplifier 147 acts as an a.c. coupled inverting amplifier with a gain of about x10.

The phase comparator 15 includes another operational amplifier 151, together with four CMOS analog switch devices 152, 153, 154 and 155 which are controlled by the signals at terminals X and Y. Switch 152 has its input connected to the output of amplifier 147, its output connected by a resistor 158 to the non-inverting input of amplifier 151 and its control terminal connected to terminal Y. Switch 153 has its input connected to the output of switch 152, its output grounded and its control terminal connected to terminal X. Switch 154 has its input connected to the output of gate 155, its output grounded and its control terminal connected to terminal Y. Switch 155 has its input connected to the output of amplifier 147, its output connected by a resistor 159 to the inverting input of amplifier 151 and its control terminal connected to terminal X. A resistor 158' connects the non inverting input of amplifier 151 to ground and a resistor 159' connects the output of amplifier 151 to its inverting input.

When the output of inverter 111 is high, switches 153 and 155 are conductive and switches 152 and 154 are non-conductive. In this mode, the output of amplifier 141 is effectively connected to the inverting input of amplifier 151 via resistor 159 and the non inverting input of amplifier 151 is grounded so that amplifier 151 operates as an inverting amplifier. When the output of the inverter 111 is low the amplifier 151 acts as a non inverting amplifier. The resistors 158, 158', 159, 159' are chosen so that the gain in both modes is about x5.

Thus, if the signal at the output of amplifier 141 which results from the transducer 13 detecting reflected ultrasonic vibrations, is in phase with the oscillator output, the output of the amplifier 151 will be substantially continuously negative. If the amplifier 141 signal is 180° out of phase with the osicllator output, the output of the amplifier 151 will be substantially continuously positive. At intermediate phase differences, the amplifier 151 output will swing between positive and negative at twice the frequency of oscillator 10, but the mean output level will be linearly dependent on the phase difference. Because of the high overall gain the mean output level of the phase comparator will be relatively insensitive to the amplitude of the ultrasonic vibrations detected by the transducer 13 for all objects of appropriate size within a specified distance range of the transducer.

Thus it will be seen that, when an object within this distance range is in motion the phase of the reflected vibrations received by the transducer 13 will vary as the distance between the object and the transducer changes and hence, the mean output level of the amplifier 151 will vary. The frequency of this variation is linearly related to the radial component of the velocity of the object relative to the transducers.

Figure 4:
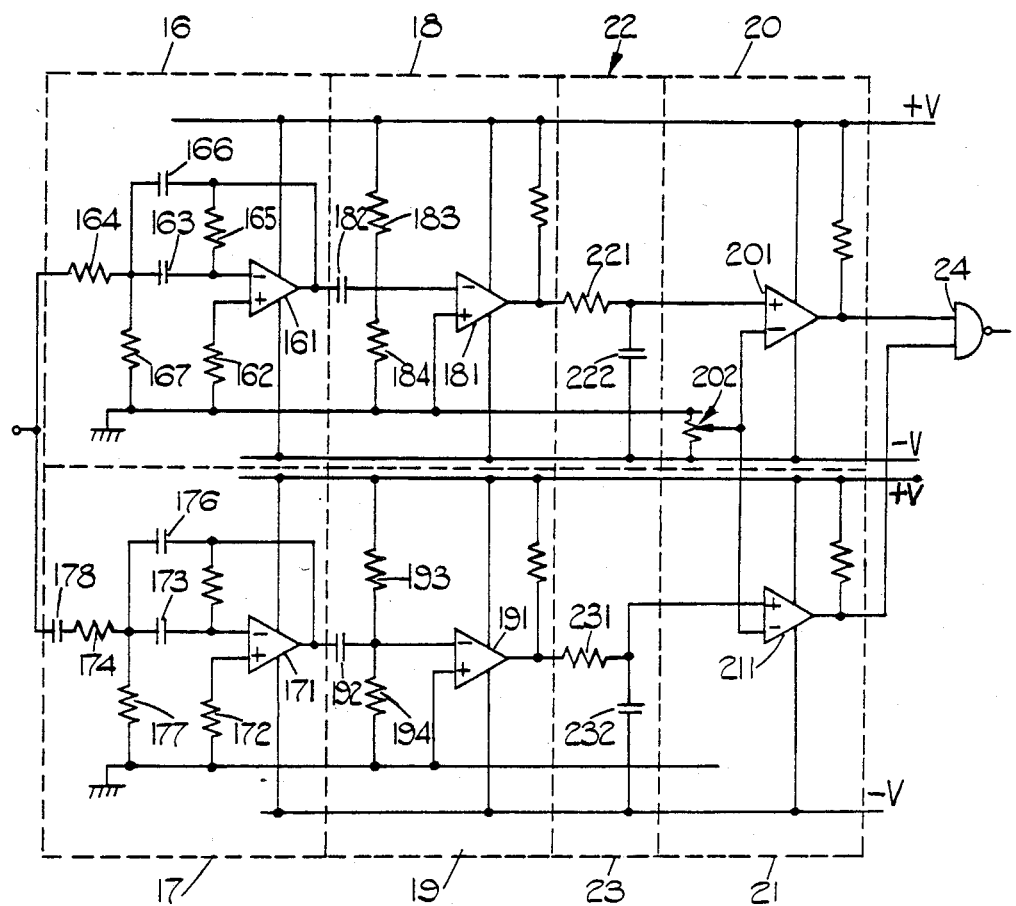
FIG. 4 is a circuit diagram showing the remainder of the circuit of FIG. 1 in detail.

As shown in FIG. 4, the filter circuit 16 is a conventional second order active band pass filter including an operational amplifier 161 which has its non-inverting input connected by a resistor 162 to ground. The inverting input of amplifier 161 is connected by a capacitor 163 and a resistor 164 to the output of the phase comparator circuit 15. A resistor 165 connects the output of amplifier 161 to its inverting input and a capacitor 166 connects the output to the common point of resistor 164 and capacitor 163, such common point being also connected by a resistor 167 to ground. The component values are chosen to give a pass band of about 28 to 38 Hz and a midband gain of about x5.

The filter circuit 17 is similar to circuit 16, consisting of components 171 to 177 corresponding to components 161 to 167, but with an additional capacitor 178 in series with the resistor 174. The components are chosen to provide a pass band of about 120 to 190 Hz.

The amplitude detection circuits 18 and 19 are identical to one another, each consisting of a voltage comparator 181 or 191 with its non inverting input grounded and its inverting input coupled to the output of the associated filter circuit by a capacitor 182 or 192. The inverting input is biased to a positive threshold voltage by a resistor chain 183 or 193 and 184 or 194 connected between the positive supply +V and ground.

When the amplitude of the output of either filter is zero or less than a predetermined value, the output of the associated comparator 181 or 191 is negative continuously. The comparator output only goes high when the output waveform of the filter has an amplitude such that its negative going peaks exceed the threshold.

The time constant circuits 22, 23 each consist of a resistor 221 or 231 and a capacitor 222 or 232 and each has a time constant of about 2 seconds. Normally each capacitor 222, 232 is held discharged by the associated comparator 181 or 191, but when either amplitude detector output goes positive the capacitor in question starts charging relatively slowly.

The threshold detectors 20 and 21, each comprise a voltage comparator 201 or 211 with its inverting input connected to the slider of a common potentiometer 202 connected between the negative supply −V and ground, and its non inverting input connected to the capacitor 222 or 232. The outputs of comparators 201 and 211 are normally low, but each goes high when the associated one of the capacitors 222 or 232 charges to a voltage higher than the voltage at the slider of the potentiometer 202.

The output of gate 24, which has its two inputs connected to the outputs of comparators 201 and 211 respectively is normally high, but goes low if the outputs of comparator 201 and 211 are both high.

This occurs only when the outputs of comparators 181 and 191 have both been high for more than a predetermined minimum time.

The example of the invention described thus operates in a manner such that it provides an output signal to a warning device, only on receiving reflected signals which are characteristically human. Clearly, where the presence of some other moving animal is to be detected, different frequency bands are used. One, two or more bands may represent the characteristic of the animal in question.

We claim:

1. A motion detector system comprising a transmitter device for transmitting oscillatory signals into a zone to be monitored, a receiver device for receiving signals reflected from objects within the zone to be monitored, a phase comparator device receiving electrical inputs from the transmitter device and the receiver device and providing an oscillatory output the frequency of which is dependent on the speed of any movement of an object in the zone to be monitored, filter means connected to the phase comparator device and having a characteristic matched to a movement profile of a specific type of object to be detected, and means connected to the output of the filter means to provide a warning signal only when the movement profile of an object in the zone to be monitored matches the characteristic of said filter means, said filter means comprising two filter circuits which have pass-bands of 28–38 Hz and 120–190 Hz respectively, and which are each connected to the output of the phase comparator device, the outputs of the two filter circuits being combined to produce a warning signal only when the output of the phase comparator device contains components in both pass bands simultaneously.

2. A motion detector circuit as claimed in claim 1 in which the outputs of the filter circuits are combined by means of a combining circuit which produces an output only if the output of the filter circuits exceed a predetermined threshold for a predetermined time.

3. A motion detector circuit as claimed in claim 2 in which said combining circuit comprises an amplitude detector circuit for each filter output, a time constant circuit for each amplitude detector circuit, a threshold detector circuit for each time constant circuit, each time constant circuit connecting the output of the associated amplitude detector circuit to the input of the associated threshold detector circuit, and a single gate have inputs connected to the outputs of the respective threshold detector circuit.

4. A motion detector circuit as claimed in claim 3 in which each amplitude detector circuit comprises a voltage comparator having its input a.c. coupled to the output of the associated filter circuit and biased so that the output of the voltage comparator is continuously of one polarity except during peaks in the output waveform of the filter circuit which exceed a predetermined voltage.

* * * * *